United States Patent
Mauri et al.

(10) Patent No.: US 9,472,216 B1
(45) Date of Patent: Oct. 18, 2016

(54) DIFFERENTIAL DUAL FREE LAYER MAGNETIC READER

(71) Applicant: Western Digital (Fremont), LLC, Fremont, CA (US)

(72) Inventors: Daniele Mauri, San Jose, CA (US); Savas Gider, San Jose, CA (US); Hui Zhao, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/863,309

(22) Filed: Sep. 23, 2015

(51) Int. Cl.
*G11B 5/39* (2006.01)

(52) U.S. Cl.
CPC ........... *G11B 5/3932* (2013.01); *G11B 5/3912* (2013.01)

(58) Field of Classification Search
None
See application file for complete search history.

(56) References Cited

U.S. PATENT DOCUMENTS

| | | | |
|---|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |

(Continued)

OTHER PUBLICATIONS

Anup G. Roy, et al., U.S. Appl. No. 14/621,712, filed Feb. 13, 2015, 30 pages.

(Continued)

*Primary Examiner* — Will J Klimowicz
(74) *Attorney, Agent, or Firm* — Convergent Law Group LLP

(57) ABSTRACT

A magnetic read apparatus has an air-bearing surface (ABS) and includes a differential read sensor, side bias structure(s) and rear magnetic bias structure(s). The differential read sensor includes first and second free layers and a nonmagnetic spacer layer between the first and second free layers in a down-track direction. The side bias structure(s) are adjacent to the first and second free layers in a cross-track direction perpendicular to the down-track direction. The side bias structure(s) magnetically bias the first and second free layers in the cross-track direction. The differential read sensor is between the ABS and the rear magnetic bias structure(s). The rear magnetic bias structure(s) provide a first magnetic bias for the first free layer in a first direction along a stripe height direction perpendicular to the ABS and provide a second magnetic bias for the second free layer in a second direction opposite to the first direction.

21 Claims, 7 Drawing Sheets

Plan View

Apex View

(56) References Cited

U.S. PATENT DOCUMENTS

| | | |
|---|---|---|
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |

(56) References Cited

U.S. PATENT DOCUMENTS

| | | |
|---|---|---|
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,126,795 B2 | 10/2006 | Funayama et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,615,996 B1 | 11/2009 | Machita et al. |
| 7,639,457 B1 | 12/2009 | Chen et al. |

(56) References Cited

U.S. PATENT DOCUMENTS

| | | |
|---|---|---|
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,826,179 B2 | 11/2010 | Shimazawa et al. |
| 7,829,264 B1 | 11/2010 | Wang et al. |
| 7,839,606 B2 | 11/2010 | Jayasekara |
| 7,843,668 B2 | 11/2010 | Machita et al. |
| 7,846,643 B1 | 12/2010 | Sun et al. |
| 7,855,854 B2 | 12/2010 | Hu et al. |
| 7,855,859 B2 | 12/2010 | Hara et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,881,023 B2 | 2/2011 | Machita et al. |
| 7,894,167 B2 | 2/2011 | Kanaya et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,961,438 B2 | 6/2011 | Mizuno et al. |
| 7,968,219 B1 | 6/2011 | Jiang et al. |
| 7,974,048 B2 | 7/2011 | Shimazawa et al. |
| 7,982,989 B1 | 7/2011 | Shi et al. |
| 8,008,912 B1 | 8/2011 | Shang |
| 8,012,804 B1 | 9/2011 | Wang et al. |
| 8,014,108 B2 | 9/2011 | Shimazawa et al. |
| 8,015,692 B1 | 9/2011 | Zhang et al. |
| 8,015,694 B2 | 9/2011 | Carey et al. |
| 8,018,677 B1 | 9/2011 | Chung et al. |
| 8,018,678 B1 | 9/2011 | Zhang et al. |
| 8,018,691 B2 | 9/2011 | Gill et al. |
| 8,023,230 B2 | 9/2011 | Machita et al. |
| 8,024,748 B1 | 9/2011 | Moravec et al. |
| 8,031,445 B2 | 10/2011 | Zhou et al. |
| 8,049,997 B2 | 11/2011 | Miyauchi et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,094,420 B2 | 1/2012 | Ayukawa et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,130,475 B2 | 3/2012 | Kawamori et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,144,437 B2 | 3/2012 | Miyauchi et al. |
| 8,146,236 B1 | 4/2012 | Luo et al. |
| 8,147,994 B2 | 4/2012 | Matsuzawa et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,179,642 B2 | 5/2012 | Kawamori et al. |
| 8,191,237 B1 | 6/2012 | Luo et al. |
| 8,194,363 B2 | 6/2012 | Hara et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,225,489 B2 | 7/2012 | Miyauchi et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,274,764 B2 | 9/2012 | Hara et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,369,048 B2 | 2/2013 | Miyauchi et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |

(56) References Cited

U.S. PATENT DOCUMENTS

| | | |
|---|---|---|
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,477,461 B2 | 7/2013 | Chou et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,553,369 B2 | 10/2013 | Song et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,247 B2 | 11/2013 | Song et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,705,212 B2 | 4/2014 | Gadbois et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,842,396 B1 | 9/2014 | Zhu |
| 8,891,208 B2 | 11/2014 | Degawa et al. |
| 8,913,349 B2 | 12/2014 | Yamane et al. |
| 9,147,404 B1* | 9/2015 | Luo .................. G11B 5/33 |
| 2002/0024777 A1 | 2/2002 | Funayama et al. |
| 2002/0039264 A1 | 4/2002 | Ohsawa et al. |
| 2007/0217077 A1 | 9/2007 | Kanaya et al. |
| 2007/0285849 A1 | 12/2007 | Jayasekara |
| 2009/0073616 A1 | 3/2009 | Shimazawa et al. |
| 2009/0130491 A1* | 5/2009 | Ohta .................. B82Y 10/00 428/811.2 |
| 2009/0135529 A1 | 5/2009 | Shimazawa et al. |
| 2009/0168264 A1 | 7/2009 | Hara et al. |
| 2009/0190272 A1 | 7/2009 | Machita et al. |
| 2009/0201612 A1 | 8/2009 | Shimazawa et al. |
| 2009/0207534 A1 | 8/2009 | Miyauchi et al. |
| 2009/0213502 A1 | 8/2009 | Miyauchi et al. |
| 2009/0273864 A1 | 11/2009 | Machita et al. |
| 2009/0290264 A1 | 11/2009 | Ayukawa et al. |
| 2009/0303779 A1 | 12/2009 | Chen et al. |
| 2010/0027168 A1 | 2/2010 | Chou et al. |
| 2010/0053820 A1 | 3/2010 | Miyauchi et al. |

(56) References Cited

U.S. PATENT DOCUMENTS

| | | |
|---|---|---|
| 2010/0079917 A1 | 4/2010 | Miyauchi et al. |
| 2010/0103562 A1 | 4/2010 | Machita et al. |
| 2010/0103563 A1 | 4/2010 | Machita et al. |
| 2010/0149689 A1 | 6/2010 | Tsuchiya et al. |
| 2010/0214696 A1 | 8/2010 | Matsuzawa et al. |
| 2010/0214700 A1 | 8/2010 | Hara et al. |
| 2010/0232066 A1 | 9/2010 | Hara et al. |
| 2010/0232073 A1 | 9/2010 | Chou et al. |
| 2010/0290157 A1 | 11/2010 | Zhang et al. |
| 2011/0051291 A1 | 3/2011 | Miyauchi et al. |
| 2011/0069417 A1 | 3/2011 | Kawamori et al. |
| 2011/0086240 A1 | 4/2011 | Xiang et al. |
| 2011/0091744 A1 | 4/2011 | Kawamori et al. |
| 2011/0232079 A1 | 9/2011 | Miyauchi et al. |
| 2011/0235216 A1 | 9/2011 | Lin |
| 2011/0317313 A1 | 12/2011 | Miyauchi et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0069642 A1 | 3/2013 | Sapozhnikov et al. |
| 2013/0149559 A1 | 6/2013 | Covington et al. |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0002930 A1* | 1/2014 | Dimitrov ............... G11B 5/398 360/235.4 |
| 2014/0035075 A1 | 2/2014 | Zhu et al. |
| 2014/0118862 A1* | 5/2014 | Covington ........... G11B 5/3929 360/128 |
| 2014/0146419 A1* | 5/2014 | Covington ........... G11B 5/3163 360/125.12 |
| 2014/0154529 A1 | 6/2014 | Yang et al. |
| 2014/0175050 A1 | 6/2014 | Zhang et al. |
| 2014/0268405 A1 | 9/2014 | Machita et al. |
| 2014/0268421 A1* | 9/2014 | Zhu ..................... G11B 5/3912 360/235.4 |

OTHER PUBLICATIONS

Feng Liu, et al., U.S. Appl. No. 14/670,340, filed Mar. 26, 2015, 30 pages.

"Perspectives of Read Head Technology for 10 Tb/in2 Recording", Han, G.C., Qiu, J.J. ; Wang, L. ; Yeo, W.K. ; Wang, C.C. Magnetics, IEEE Transactions on (vol. 46 , Issue: 3 ).

"Downtrack response of differential reader for high density magnetic recording," Li Wang, and Guchang Han.

\* cited by examiner

ABS View

Plan View

Apex View

Plan View

Apex View

Plan View

Apex View

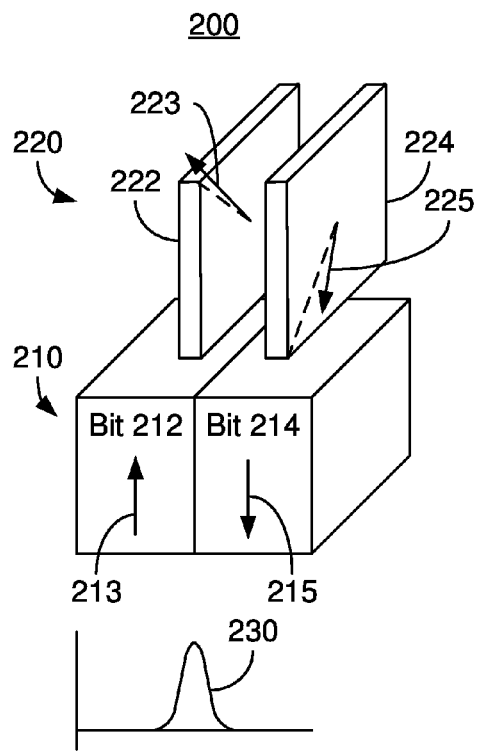
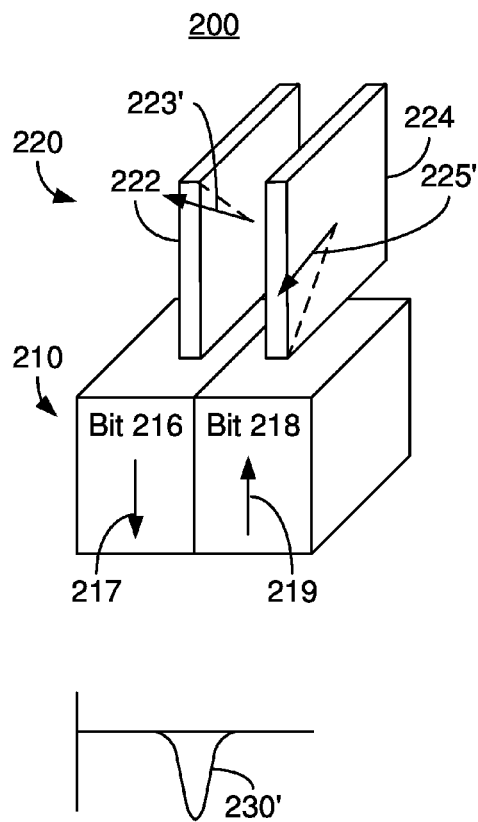
FIG. 5A  FIG. 5B
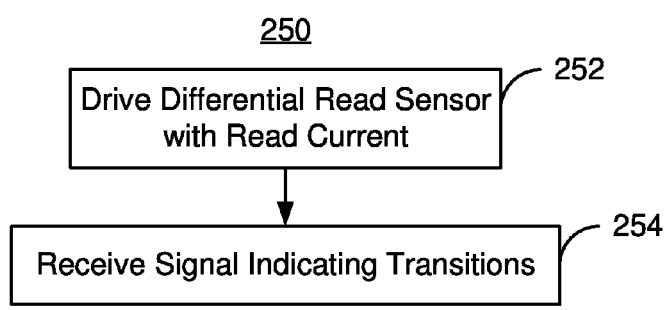
FIG. 6

DIFFERENTIAL DUAL FREE LAYER MAGNETIC READER

BACKGROUND

FIG. 1 depicts an air-bearing surface (ABS) view of a conventional differential read transducer usable in magnetic recording technology applications. The conventional read transducer 10 includes insulator 14, magnetic bias structures 16, and differential dual spin valve sensor 20. The differential dual spin valve sensor 20 typically includes two giant magnetoresistive (GMR) sensors or two tunneling magnetoresistive (TMR) sensors. The differential dual spin valve sensor 20 includes two antiferromagnetic (AFM) layers 22, two pinned layers 24, two nonmagnetic spacer layers 26, two free layers 28, and a nonmagnetic layer 29 between the two free layers 28. Also shown is a capping layer 30. Seed layer(s) might also be used. Each free layer 28 has a magnetization sensitive to an external magnetic field. The free layers 28 function as sensor layers for the differential dual spin valve sensor 20. If the differential dual spin valve sensor 20 is to be used in a current perpendicular to plane (CPP) configuration, then current is driven in a direction substantially perpendicular to the plane of the layers 22, 24, 26, 28 and 29. Conversely, in a current-in-plane (CIP) configuration, then conductive leads (not shown) would be provided on the magnetic bias structures 16. The magnetic bias structures 16 are used to magnetically bias the free layers 28.

Although the conventional transducer 10 functions, there are drawbacks. The trend in magnetic recording is to higher areal density memories. The large stack size for the conventional differential dual spin valve sensor 20 may be challenging to fabricate at smaller track widths. For example, the height of the stack from the bottom AFM layer 22 to top AFM layer 22 may be on the order of forty nanometers. A small track width for such a large stack height may be difficult to achieve. Fabrication may be further complicated by the orientation of the AFM layers 22. In general, these AFM layers 22 are magnetically biased in opposite directions. Such biasing may be challenging to accomplish. Further, side reading may be adversely affected by the absence of shields. Accordingly, what is needed is a system and method for improving the performance and/or fabrication of a magnetic recording read transducer at higher areal densities.

BRIEF DESCRIPTION OF SEVERAL VIEWS OF THE DRAWINGS

FIGS. 5A-5B depict perspective views of an exemplary embodiment of a portion of a differential dual free layer magnetic read transducer reading a media.

FIG. 6 is flow chart depicting an exemplary embodiment of a method for reading using a differential dual free layer magnetic recording read transducer.

DETAILED DESCRIPTION OF THE PREFERRED EMBODIMENTS

Figure 1:
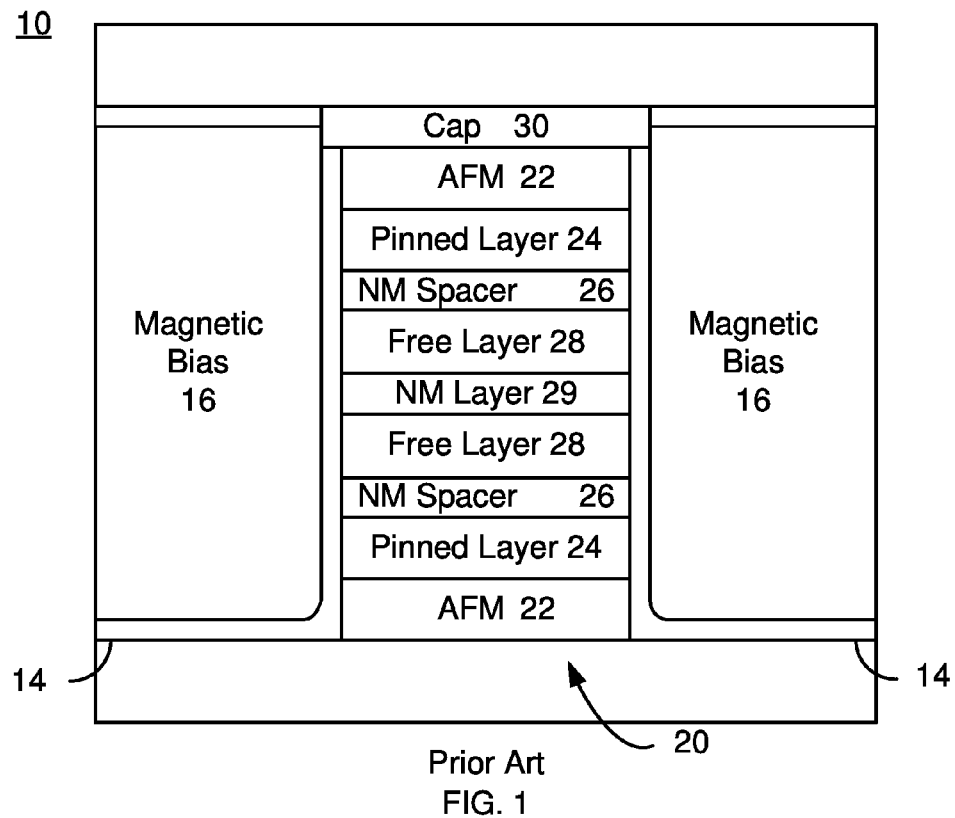
FIG. 1 depicts an ABS view of a conventional differential dual spin valve magnetic recording read transducer.
Figure 2A:
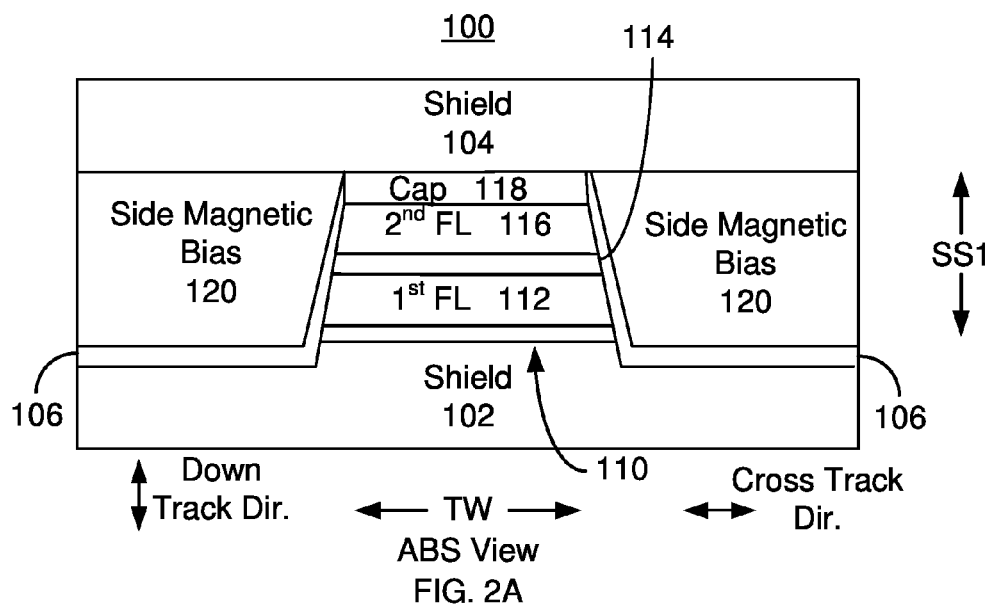
FIGS. 2A-2C depicts ABS, plan and apex views of an exemplary embodiment of a portion of a dual free layer magnetic read transducer.
Figure 2B:
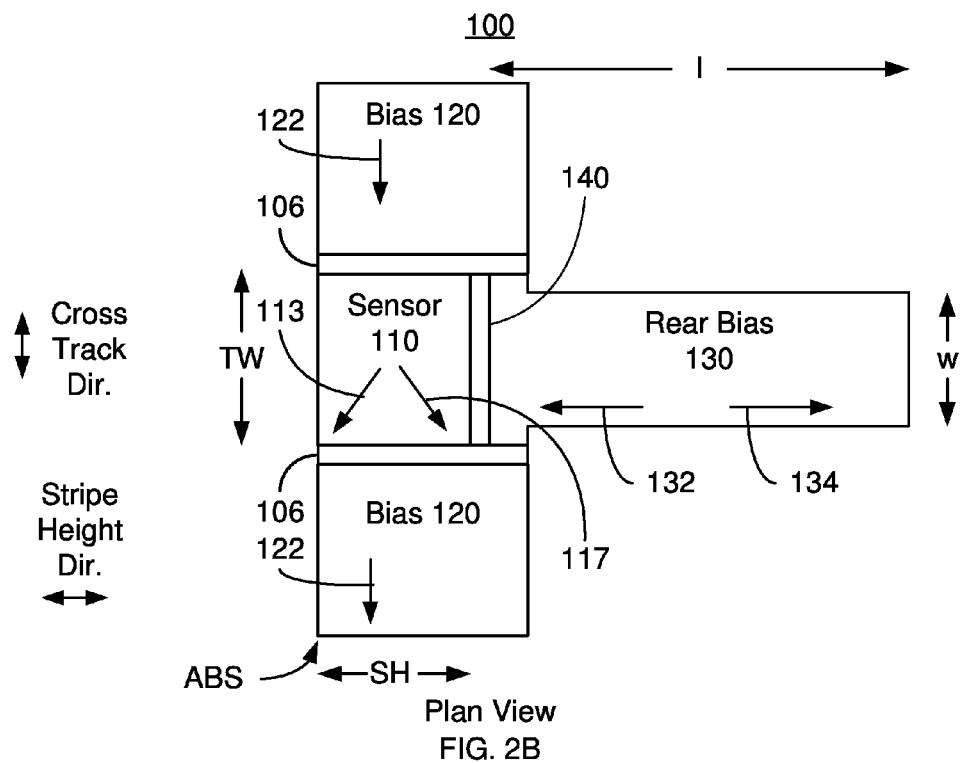
Figure 2C:
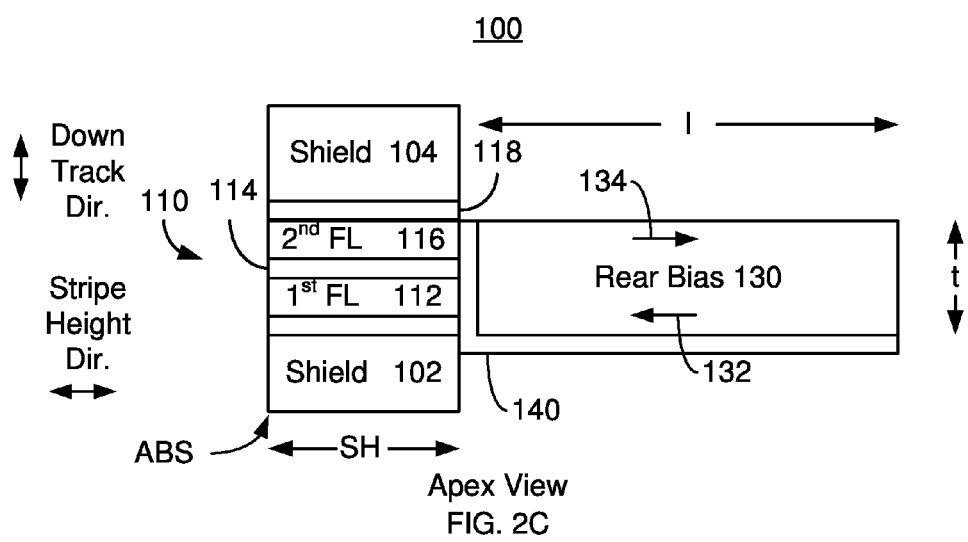

FIGS. 2A-2C depict ABS, plan and side views of an exemplary embodiment of a portion of a magnetic read transducer 100. For clarity, FIGS. 2A-2C are not to scale. The read transducer 100 may be part of a read head or may be part of a merged head that also includes a write transducer. The head of which the read transducer 100 is a part is contained in a disk drive having a media, a slider and the head coupled with the slider. Further, only a portion of the components of the read transducer 100 are depicted.

The transducer 100 includes optional magnetic shields 102 and 104, insulator 106, read sensor 110, side bias structures 120 and rear bias structure 130 that may be separated from the read sensor 110 by an insulating layer 140. The magnetic shields 102 and 104 may be a monolithic soft magnetic shield, may be a multilayer antiferromagnetically coupled (AFC) shield or may have another structure. The read sensor 110 is between the rear bias structure 130 and the ABS. Further, an insulating layer 140 may separate the rear bias structure 130 from the sensor 110 and bias structures 120. Such an insulating layer 140 may be used if the rear bias structure 130 is conductive. In addition, although the shields 102 and 104 are shown as extending only to the stripe height of the sensor 110, the shields 102 and 104 generally extend significantly further in the stripe height direction. However, the shields 102 and 104 may also be magnetically decoupled from the rear bias structure 160. Thus, the insulating layer 140 may extend along the depth of the rear bias structure 130. For example, in some embodiments, the insulating layer 140 is at least ten Angstroms and not more than forty Angstroms thick. The insulating layer 140 is also nonmagnetic. Thus, the read sensor 110 may be electrically insulated from the rear bias structure 130 and not exchanged coupled with the rear bias structure 130. Although not depicted in FIGS. 2A-2C, an insulating capping layer may also be provided on top of the rear bias structure 130.

The read sensor 110 includes a first free layer 112 and a second free layer 116 separated by a nonmagnetic spacer layer 114. The nonmagnetic spacer layer 114 may be conductive, an insulating tunneling barrier layer such as an MgO layer having a thickness of not more than twenty Angstroms. Alternatively, the nonmagnetic spacer layer 114 may have another structure. The free layers 112 and 116 are ferromagnetic and may include multiple sublayers. In some embodiments, the track width (TW) of the read sensor 110 is not more than thirty nanometers. In some such embodiments, the track width is not more than twenty nanometers. In addition, as can be seen in FIGS. 2A-2C, the sensor 110 only includes magnetic layers in the free layers 112 and 116. No reference layers or pinning (AFM) layers are utilized. The magnetic reader 100 may be free of magnetic layers between the free layer 112 and the shield 102. Similarly, the magnetic reader 100 may be free of magnetic layers between the free layer 116 and the shield 104. The free layers 112 and 116 are also shown as adjoining the nonmagnetic spacer layer 114. As a result, the sensor 110 is thin in the down track direction. Thus, the shield-to-shield spacing, SS1, of the magnetic transducer may be reduced. In some embodiments, the shield-to-shield spacing is the combined thickness of the layers 112, 114, 116, 118 (if present) and any nonmagnetic seed layers. For example, the shield-to-shield spacing may be less than twenty nanometers. In some embodiments, the shield-to-shield spacing may be less than sixteen nanometers.

The free layers 112 and 116 are biased such that their magnetic moments 113 and 117, respectively are in a scissor mode. The free layers 112 and 116 are also biased such that the sensor 110 may function as a differential read sensor for a perpendicular medium (not shown). A perpendicular medium is one in which the directions of magnetization of the bits are substantially perpendicular to the surface of the medium. The read sensor 110 is a giant magnetoresistive (GMR) or tunneling magnetoresistive (TMR) read sensor in which the magnetoresistance is developed between the two ferromagnetic free layers 112 and 116. Based on the angle between the magnetic moments 113 and 117, the resistance of the read sensor 110 changes. In the embodiment shown, the magnetic moments 113 and 117 are biased to be parallel and in cross-track direction by the side bias structures 120. Without more, the free layer magnetic moments 113 and 117 may be parallel to the magnetic moments 122 of the side bias structures 120. However, the rear bias structure 130 also biases the free layer magnetic moments 113 and 117 perpendicular to the ABS. As can be better seen in FIGS. 2B and 2C the rear bias structure 130 biases the magnetic moment 113 in one direction perpendicular to the ABS, while magnetically biasing the magnetic moment 117 of the free layer 116 in the opposite direction. For example, the moment 132 of the rear bias structure 130 magnetically biases the magnetic moment 113 of the free layer 112 out of the plane of the ABS/transducer and toward the media. The magnetic moment 134 of the rear bias structure 130 biases the magnetic moment 117 of the free layer 116 into the plane of the ABS/transducer and away from the media. Consequently, the magnetic moments 113 and 117 of the free layer 112 and 116, respectively, are biased in a scissor state. Note that in some embodiments, the free layers 112 and 116 may be ferromagnetically coupled or antiferromagnetically coupled through the nonmagnetic spacer layer 114.

As discussed above, the side bias structures 120 magnetically bias the free layers 112 and 116 in the cross track direction. The side bias structures 120 may include soft magnetic materials, such as NiFe, and have magnetic moment 122.

The rear bias structure 130 may be a soft magnetic bias structure or may have another structure including but not limited to hard magnetic layers. For example, soft magnetic layers used in the rear bias structure 130 may have a coercivity of less than one hundred Oersted. In some embodiments, the coercivity is not more than ten Oersted. The soft magnetic layer(s) may include single alloys, multiple layer(s), a mixed-composition alloy and/or other components. Other components, such as a pinning structure, may be included in the rear bias structure 130. A pinning structure is a magnetic component used to magnetically bias other portions of the rear magnetic bias structure 130. For example, the pinning structure might be an antiferromagnetic (AFM) layer. In other embodiments, other configurations might be possible.

As discussed above, the rear bias structures 130 provides magnetic biasing in opposite directions for the free layers 112 and 116. Thus, magnetic moments 132 and 134 are shown in proximity to the layers 112 and 116, respectively. In some embodiments, the rear bias structure 130 includes antiferromagnetically coupled soft magnetic layers. The layers may be antiferromagnetically coupled via a Ruderman-Kittel-Kasuya-Yosida (RKKY) interaction. Because they are antiferromagnetically coupled, such magnetic layers could provide the magnetic biasing in opposite directions for the free layers 112 and 116. In such embodiments, the layer having the magnetic moment 132 may be desired to have its top surface closer to the top surface of the free layer 112 than to the bottom surface of the free layer 116 (not more than halfway between the bottom surface of the free layer 116 and the top surface of the free layer 112). Similarly, the layer having the magnetic moment 134 may be desired to have its bottom surface closer to the bottom surface of the free layer 116 than to the top surface of the free layer 112. Such a structure may provide the desired magnetic bias for the free layers 112 and 116.

The magnetic moments 132 and 134 of the rear bias structure 130 is used to bias the sensor 110 in the stripe height direction. Consequently, the rear bias structure 130 has a magnetic anisotropy in the stripe height direction. This anisotropy may arise from one or more effects. For example, the rear bias structure 130 may have a shape anisotropy. In such embodiments, the width in the cross-track direction, w, is less than the length in the stripe height direction, I (w<I). In some embodiments, the length is at least four multiplied by the width. In some such embodiments, the length is at least ten multiplied by the width. The width is shown in FIG. 2B as being slightly smaller than track width, TW, of the sensor 110. In other embodiments, other widths can be used. For example, in some cases, the width is being substantially the same as the track width of the read sensor 110. In such embodiments, this is because the sensor 110 and rear bias structure 130 are defined in the cross-track direction using a single mask. Stated differently, the rear bias structure 130 and sensor 110 may be self-aligned. The thickness in the down-track direction, t, of the rear bias structure 130 may also be set to provide the desired magnetic biasing of the free layers 112 and 116. Similarly, the rear bias structure 130 may have a crystalline anisotropy that favors a perpendicular-to-ABS orientation of the magnetic moment 132 and 134. The rear bias structure 130 may have a magnetic anisotropy due to deposition in a magnetic field. In some embodiments, the rear bias structure 130 may have a magnetoelastic anisotropy, for example due to magnetostriction. In other embodiments, a pinning layer (not shown in FIGS. 2A-2C) or other structure (not shown) may be used to induce the magnetic anisotropy in the rear bias structure 130. One or more of these mechanisms may be used in providing the desired magnetic characteristics for the rear bias structure 130.

Further, the rear bias structure 130 provides sufficient moment to bias the magnetic moments 113 and 117 of the free layers 112 and 116, respectively. For example, in some embodiments, the rear soft bias structure has a saturation magnetization-thickness product of at least one milli-emu/$cm^2$ and not more than three milli-emu/$cm^2$. In some such embodiments, the saturation magnetization-thickness product is not more than two milli-emu per $cm^2$. In general, however, the saturation magnetization-thickness product of the rear bias structure 130 depends upon the saturation magnetization-thickness products of the free layer and the side bias structures. The thickness used in the saturation magnetization-thickness product is the depth of each of the magnetic layer(s) of the rear bias structure 130 in the down track direction.

The magnetic transducer 100 may be suitable for use in high density magnetic recording applications, for example those having a sensor track width (and thus rear bias structure 130 width) of not more than thirty nanometers. In some embodiments, the track width and rear bias structure width may be not greater than twenty nanometers. The read sensor 110 may not include an antiferromagnetic layer or a pinned layer. Consequently, the shield-to-shield spacing (SS1) between the shields 102 and 104 may be reduced. The lower shield-to-shield spacing may be conducive to use in high areal density magnetic recording. The use of the differential mode may also enhance the read signal and allow the differential read sensor 110 to detect transitions between bits. This scissor mode may be more reliably achieved because of the presence of the rear bias structure 130. In particular, the shape anisotropy, width and other aspects of the rear bias structure 130 may allow for more reliable biasing of the read sensor. Further, the linear resolution of the read transducer 100 may be given by the distance between the free layers 112 and 116. The thickness of the nonmagnetic spacer layer 114 may be on the order of two to three nanometers or less. Thus, the linear resolution of the magnetic junction 100 may be improved. The magnetic read transducer 100 may thus be suitable for higher density magnetic recording.

Figure 3A:
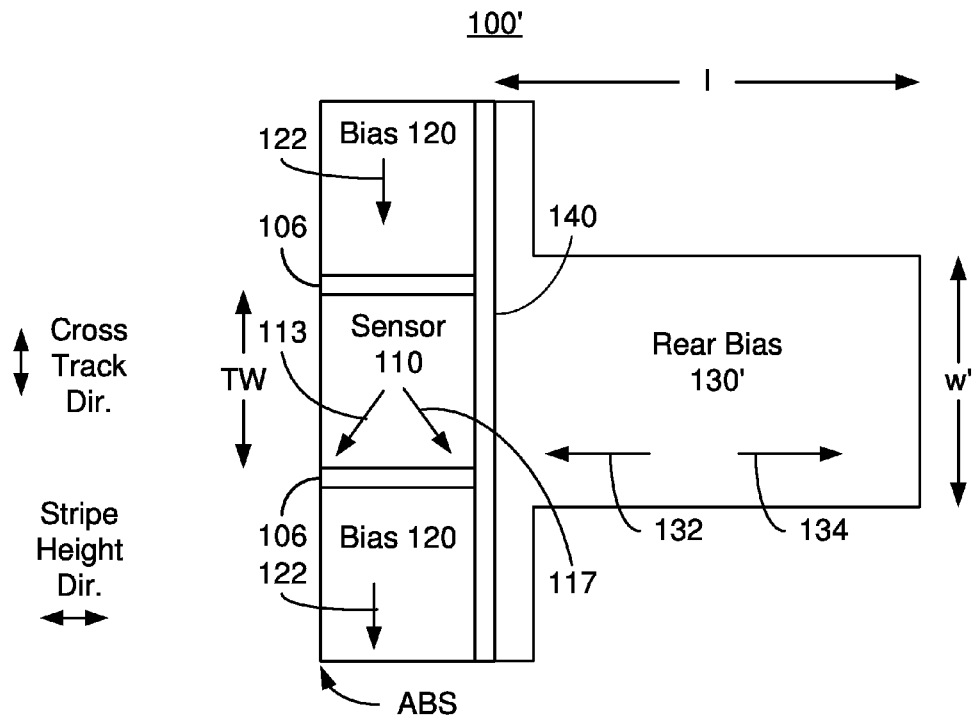
FIGS. 3A-3B depict plan and apex views of another exemplary embodiment of a portion of a differential dual free layer magnetic read transducer.
Figure 3B:
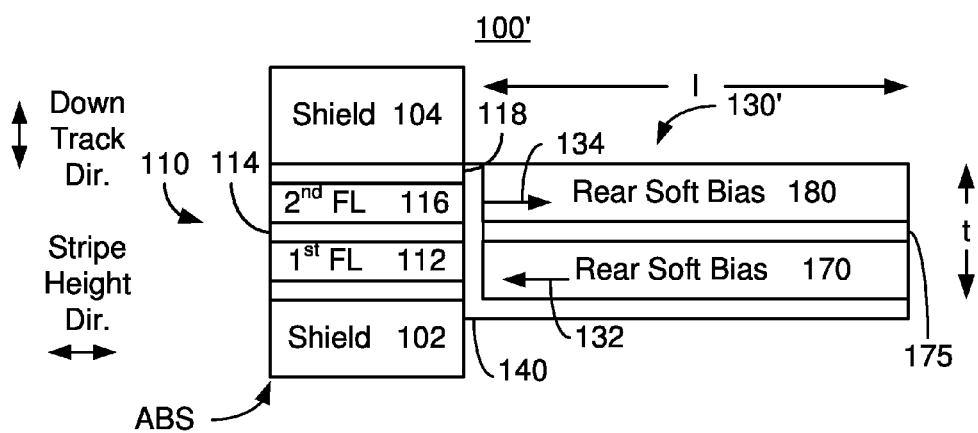

FIGS. 3A and 3B depict plan and apex views, respectively, of another embodiment of a magnetic read transducer 100'. For clarity, FIGS. 3A and 3B are not to scale. The read transducer 100' may be part of a read head or may be part of a merged head that also includes a write transducer. The head of which the read transducer 100' is a part is part of a disk drive having a media, a slider and the head coupled with the slider. The transducer 100' corresponds to the transducer 100. Consequently, analogous components are labeled similarly. For example, the transducer 100' includes a read sensor 110 having free layers 112 and 116 separated by a nonmagnetic spacer layer 114 that are analogous to such structures in the transducer 100. Thus, the read sensor 110 may be a differential read sensor in which the free layers 112 and 116 are biased in a scissor mode. Thus, the components 102, 104, 110, 112, 114 116, 130' and 140 have a similar structure and function to the components 102, 104, 110, 112, 114 116, 130 and 140, respectively, depicted in FIGS. 2A-2C. Further, although an ABS view is not shown, the transducer 100' may appear substantially the same from the ABS as the transducer 100.

In the embodiment shown in FIGS. 3A-3B, the rear bias structure 130' expressly includes two soft magnetic layers 170 and 180 separated by a nonmagnetic layer 175. The soft magnetic layer 170 and 180 may also be antiferromagnetically coupled through the nonmagnetic layer 175, for example via an RKKY interaction. The bias structure 130' may be configured such that the magnetic moments 132 and 134 are stable perpendicular to the ABS. For example, the magnetic layer 170 and 180 of the rear bias structure 130' may each have a magnetic anisotropy analogous to that described above for the rear bias structure 130. For example, a shape anisotropy, crystalline anisotropy, pinning layer(s) and/or other mechanism may be used to stabilize the magnetizations 132 and 134. In some embodiments, the length, l, of the layers 170 and 180 may be much greater than the width, w', or heights of the layers 170 and 180. In the embodiment shown, the height, t, of the rear bias structure 130' is shown as the same as that of the read sensor 110. However, the heights may differ. In addition, the top of the soft bias layer 170 is shown aligned with the top of the free layer 112 in the down track direction. Similarly, the bottom of the soft bias layer 180 is shown aligned with the bottom of the free layer 116 in the down track direction. In other embodiments, these surfaces may not be aligned. However, the top of the soft layer 170 may be closer to the top of the free layer 112 than to the bottom of the free layer 116. Similarly, the bottom of the soft bias layer 180 may be closer to the bottom of the free layer 116 than to the top of the free layer 112. Thus, the soft bias layers 170 and 180 magnetically bias the free layers 112 and 116 in opposite directions substantially perpendicular to the ABS.

Note that in the embodiment shown in FIGS. 3A and 3B, the width, w', of the rear bias structure 130' differs from the track width. In the embodiment shown, the widths of the read sensor 110 and rear bias structure 130' may be defined using separate processing step and/or different masks. In other embodiments, the width w' may be substantially the same as the track width TW.

The magnetic transducer 100' shares the benefits of the magnetic transducer 100. The magnetic transducer 100' may be suitable for use in higher density magnetic recording for example due to a smaller shield-to-shield spacing and/or a higher linear resolution. Performance of the sensor 110 may thus be improved.

Figure 4A:
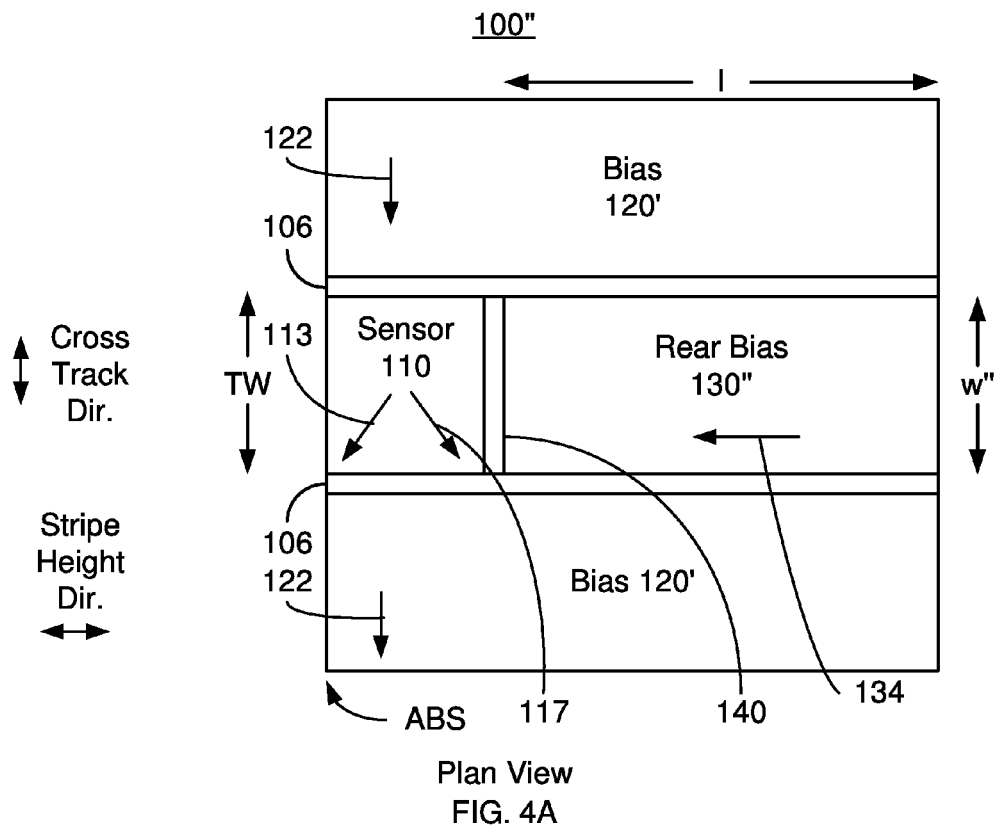
FIGS. 4A-4B depict plan and side views of another exemplary embodiment of a portion of a differential dual free layer magnetic read transducer.
Figure 4B:
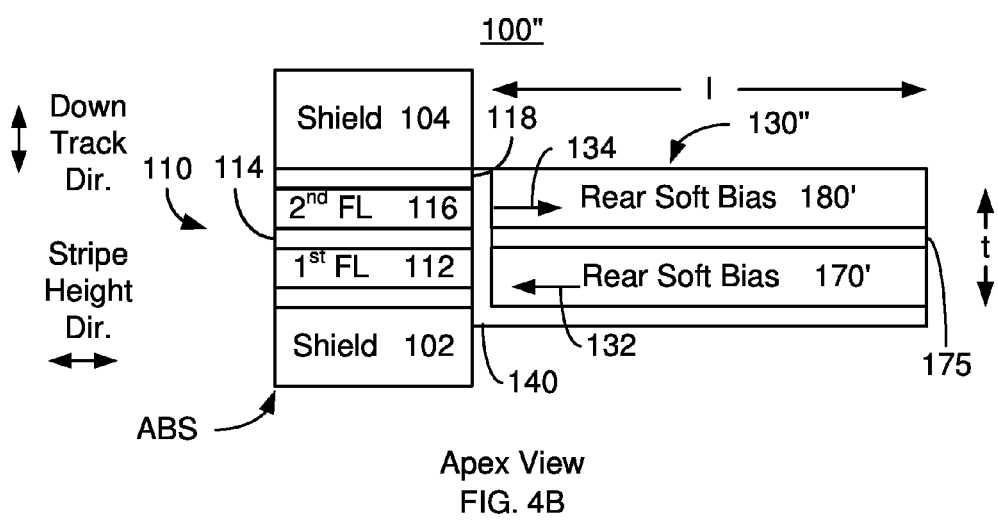

FIGS. 4A and 4B depict plan and apex views of another embodiment of a magnetic read transducer 100". For clarity, FIGS. 4A and 4B are not to scale. The read transducer 100" may be part of a read head or may be part of a merged head that also includes a write transducer. The head of which the read transducer 100" is a part is part of a disk drive having a media, a slider and the head coupled with the slider. The transducer 100" corresponds to the transducers 100 and/or 100'. Consequently, analogous components are labeled similarly. For example, the transducer 100" includes a differential read sensor 110 having free layers 112 and 116 separated by a nonmagnetic spacer layer 114 that are analogous to such structures in the transducer 100. Thus, the components 102, 104, 106, 110, 112, 114, 116, 120', 130", 140, 170', 175' and 180' have a similar structure and function to the components 102, 104, 106, 110, 112, 114 116, 120, 130/130', 140, 170, 175 and 180, respectively, depicted in FIGS. 2A-2C and 3A-3B. Further, although an ABS view is not shown, the transducer 100" may appear substantially the same from the ABS as the transducer 100/100'.

In the embodiment shown in FIGS. 4A-4B, the rear bias structure 130" includes antiferromagnetically coupled soft magnetic layers 170' and 180'. The width of the rear bias structure 130" in the cross track direction, w" is equal to the track width of the sensor 110. Thus, in the embodiment shown, the rear bias structure 130" and the sensor 110 may be self-aligned. The top surface of the rear soft bias layer 170' is shown as aligned with the top surface of the free layer 112. Similarly, the bottom surface of the rear soft bias layer 180' is depicted as aligned with the bottom surface of the free layer 116. Other configurations are possible. However, the layers 170' and 180' are desired to magnetically bias the free layers 112 and 116, respectively, in the directions of their magnetic moments 132 and 134, respectively. Thus, the magnetic anisotropies and/or other characteristics of the rear soft bias structure 130" may be analogous to those described above.

The side bias structures 120' depicted in FIG. 4A extend further in the stripe height direction than the sensor 110. Thus, the stripe height/back edge of the sensor 110 may be defined separately from the back edges of the side bias structures 120'. The side bias structures 120' are shown as extending as far as the rear bias structure 130" in the stripe height direction. In other embodiments, however, the side bias structures 120' may terminate a different distance from the ABS than the rear bias structure 130".

The magnetic transducer 100" shares the benefits of the magnetic transducer(s) 100 and/or 100'. The magnetic transducer 100" may be suitable for use in higher density magnetic recording for example due to a smaller shield-to-shield spacing and/or a higher linear resolution. Performance of the sensor 110 may thus be improved.

FIGS. 5A and 5B depict perspective views of an exemplary embodiment of a portion of a data storage device 200 as well as a corresponding read signal 230 and 230', respectively. For clarity only a portion of the data storage device, read transducer and media are shown. FIGS. 5A and 5B are also not to scale. Operation of the magnetic transducers 100, 100' and 100" may be understood with respect to FIGS. 5A and 5B. The data storage device 200 includes transducer having a differential read sensor 220 and media 210. The read sensor 220 is a differential read sensor including free layers 222 and 224 having magnetic moments 223 and 225, respectively. The read sensor 220 is analogous to the read sensor 110. The positions of the magnetic moments 223 and 225 in the absence of a field from the media are denoted by dashed lines. In the embodiment shown, the free layer magnetic moments 223 and 225 are biased to be perpendicular in the absence of an external field. However, other configurations are possible.

The media 210 is a perpendicular media in which the data are stored such that the magnetic moments are substantially perpendicular to the media surface. For the purposes of this explanation, a logical "1" occurs for a magnetic moment directed out of the plane of the media and a logical "0" occurs for a magnetic moment directed into the plane of the media. Thus, in FIG. 5A, bit 212 stores a "1" using magnetic moment 213, while bit 214 stores a "0" using magnetic moment 215. In FIG. 5B, bit 216 stores a "0" using magnetic moment 217, while bit 218 stores a "1" using magnetic moment 219.

In FIG. 5A, the read sensor 220 is used to read a transition from a "1" in bit 212 to a "0" in bit 214. It is presumed that the previous bits stored a logical "1". Thus, both magnetic moment 223 and 225 would be canted in the same direction (up) prior to the bits 212 and 214. As the sensor 220 approaches the transition between the bits 212 and 214, the free layer 224 starts to respond to the field due to the bit 214. Thus the moment 225 begins to rotate down, further from the magnetic moment 223 of the free layer 222. As the read sensor 220 begins passing over the transition, the free layer moment 225 responds primarily to the magnetic moment 215 of the bit 214 and is rotated down. In contrast, the free layer moment 223 still responds primarily to the magnetic moment 213 of the bit 212 and is rotated up. When the center of the read sensor 220 passes over the transition, the magnetic moments 223 and 225 may be separated by the largest (obtuse) angle. This is the situation depicted in FIG. 5A. Thus, a maximum in the signal 230 occurs may occur the center of the read sensor 220 passes over the transition between the bits 212 and 214. As the read sensor 220 continues, the free layer magnetic moment 223 responds more to the magnetic moment 215 of the bit 214 and rotates down. The angle between the free layer magnetic moments 223 and 225 decreases. Thus, the signal 230 decreases as the read sensor 220 passes the transition.

In FIG. 5B, the read sensor 220 is used to read a transition from a "0" in bit 216 to a "1" in bit 218. It is presumed that the previous bits stored a logical "0". Thus, both magnetic moment 223 and 225 would be canted in the same direction (down) prior to the bits 216 and 218. As the sensor 220 approaches the transition between the bits 216 and 218, the free layer 224 starts to respond to the field due to the bit 218. Thus the moment 225' begins to rotate up, closer to the magnetic moment 223' of the free layer 222. As the read sensor 220 begins passing over the transition, the free layer moment 225' responds primarily to the magnetic moment 219 of the bit 218 and is rotated up. In contrast, the free layer moment 223' still responds primarily to the magnetic moment 217 of the bit 216 and is rotated down. When the center of the read sensor 220 passes over the transition, the magnetic moments 223' and 225' may be separated by the smallest (acute) angle. This is the situation depicted in FIG. 5B. Thus, a minimum in the signal 230' occurs may occur the center of the read sensor 220 passes over the transition between the bits 216 and 218. As the read sensor 220 continues, the free layer magnetic moment 223' responds more to the magnetic moment 219 of the bit 218 and rotates up. The angle between the free layer magnetic moments 223' and 225' decreases. Thus, the signal 230' decreases as the read sensor 220 passes the transition. As such, the reader 220 may detect transitions in the media 210. The read sensor 220 is, therefore, a differential read sensor. Thus, the read sensor 220 may be seen as measuring a gradient in the magnetic field due to the bits 212, 214, 216 and 218 stored in the media 210.

FIG. 6 is an exemplary embodiment of a method 250 for utilizing a read transducer such as the devices 100, 100', 100" and/or 200. For simplicity, some steps may be omitted, interleaved, combined, have multiple substeps and/or performed in another order unless otherwise specified. The method 250 is described in the context of the magnetic recording disk drive 200. However, the method 250 may be used for the transducer(s) 100', 100" and/or 100".

The read sensor 220 is driven with a read current, via step 252. The read current may be used to obtain a voltage across the read sensor 220. The read sensor 220 is passed in proximity to the media 210 while the read current is driven through the read sensor 220 in step 252.

A signal is received from the differential read sensor 220, via step 254. The signal may be a current or voltage indicative of the magnetoresistance between the free layers 222 and 224. Thus, the signal received in step 254 indicates the presence of transitions between bits.

Using the method 250, the read sensor 220 and/or 110 may be used. Thus, reading of higher areal density magnetic media may be achieved.

Figure 7:
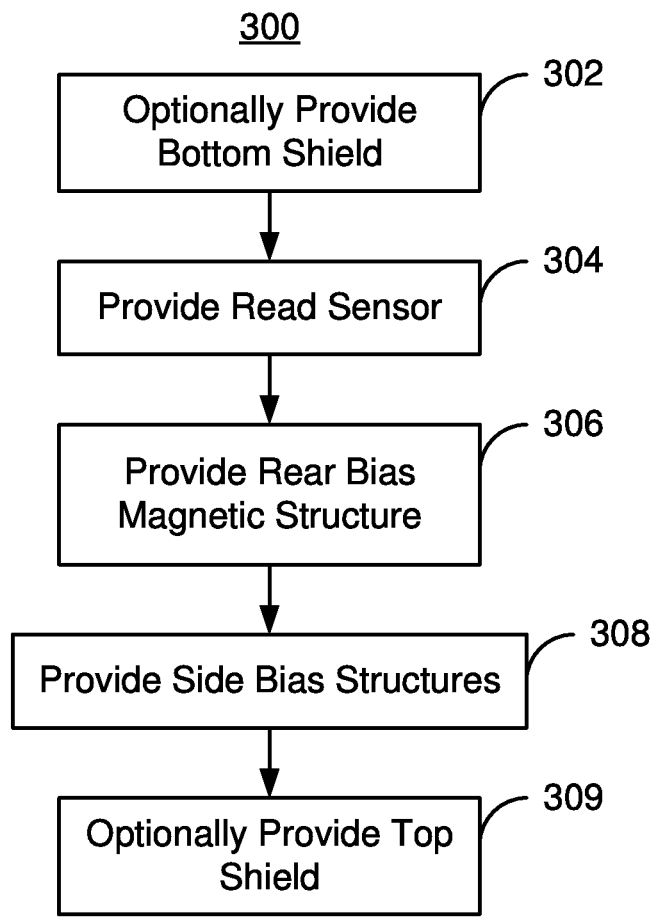
FIG. 7 is a flow chart depicting an exemplary embodiment of a method for fabricating a differential dual free layer magnetic read transducer.

FIG. 7 is an exemplary embodiment of a method 300 for providing a read transducer. For simplicity, some steps may be omitted, interleaved, combined, have multiple substeps and/or performed in another order unless otherwise specified. The method 300 is described in the context of providing a magnetic recording disk drive and transducer 100. However, the method 300 may be used in fabricating the transducer 100', 100" and/or 200. The method 300 may be used to fabricate multiple magnetic read heads at substantially the same time. The method 300 may also be used to fabricate other magnetic recording transducers. The method 300 is also described in the context of particular layers. A particular layer may include multiple materials and/or multiple sublayers. The method 300 is described in the context of a disk drive. However, the method may be used in other applications employing a magnetoresistive and bias structures. The method 300 also may start after formation of other portions of the magnetic recording transducer.

The bottom shield 102 may optionally be provided, via step 302. The read sensor 110 is provided, via step 304. Step 304 may include depositing a stack of layers for the read sensor and defining the read sensor in the cross-track and stripe height directions. The rear bias structure 130 is provided, via step 306. Step 306 may be performed after the sensor 110 has been defined in at least the stripe height direction. Thus, at least part of step 306 is performed after at least part of step 304. Step 306 may include providing antiferromagnetically coupled soft magnetic layers such as the layers 170/170' and 180/180'. Steps 304 and 306 also include defining the read sensor 110 and rear magnetic bias structure 130 in the track width direction. In some embodiments, the track width of the read sensor 110 and the width of the rear magnetic bias structure 130 are defined together.

The side bias structures 120 are provided, via step 308. Step 308 is performed after the read sensor is defined in the cross-track direction in step 304. Thus, at least part of step 304 is performed before step 308. Step 308 may include depositing the insulating layer 106, depositing the material (s) for the magnetic bias structures 120. A mill step and planarization, such as a chemical mechanical planarization (CMP) may also be performed. The top shield 104 may optionally be provided in step 309.

Using the method 300, the transducers 100, 100', 100" and/or 200 may be fabricated. Thus, the benefits of one or more of the transducers 100, 100', 100" and/or 200 may be achieved.

Figure 8:
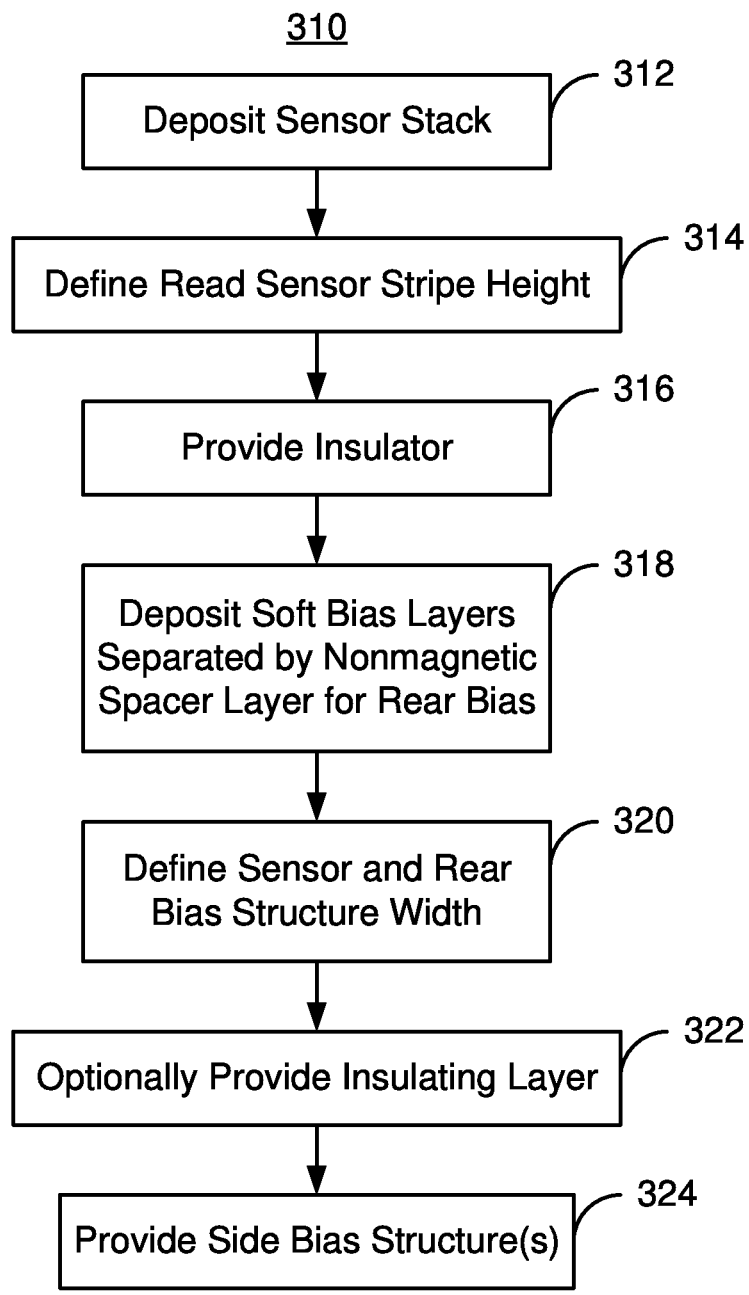
FIG. 8 is flow chart depicting an exemplary embodiment of a method for providing a differential dual free layer sensor.

FIG. 8 is an exemplary embodiment of a method 310 for providing a rear bias structure of a read transducer. For simplicity, some steps may be omitted, interleaved, combined, have multiple substeps and/or performed in another order unless otherwise specified. The method 310 is described in the context of providing a magnetic recording disk drive and transducer 100'. However, the method 310 may be used in fabricating the transducer 100, 100" and/or 200. The method 310 may be used to fabricate multiple magnetic read heads at substantially the same time. The method 310 may also be used to fabricate other magnetic recording transducers. The method 310 is also described in the context of particular layers. A particular layer may include multiple materials and/or multiple sub-layers. The method 310 is described in the context of a disk drive. However, the method may be used in other applications employing a magnetoresistive and bias structures. The method 310 also may start after formation of other portions of the magnetic recording transducer.

The read sensor stack is deposited, via step 212. Step 212 includes depositing the free layer 112, depositing the nonmagnetic layer 114 and depositing the free layer 116. The read sensor 110 is defined in the stripe height direction, via step 314. In some embodiments, step 314 occurs before the read sensor is defined in the cross-track direction. Step 314 may include masking and ion milling the read sensor stack. Thus, space may be made for the rear bias structure 130/130'/130". The insulating layer 140 is provided, via step 316.

The layers 170, 175 and 180 are deposited to the desired thicknesses, via step 318. Thus, the magnetic layers 170 and 180 may be antiferromagnetically coupled through the nonmagnetic layer 175.

The rear bias structure 130' and the read sensor 110 may be defined in the cross track direction, via step 320. Thus, the rear bias structure 130' and the read sensor 110 are self-aligned and have matching track width/width. In other embodiments, the widths of the rear bias structure 130' and the read sensor 110 may be defined separately.

An insulating layer 106 may be provided, via step 322. The side bias structures 120 may then be provided, via step 324.

Thus, the magnetic transducer 100' may be fabricated. The method 320 may also be used to fabricate the transducer (s) 100, 100" and/or 200. Thus, the benefits of one or more of the transducers 100, 100', 100" and/or 200 may be achieved.

We claim:

1. A magnetic read apparatus having an air-bearing surface (ABS) comprising:
   a differential read sensor including a first free layer, a second free layer and a nonmagnetic spacer layer residing between the first free layer and the second free layer in a down-track direction;
   at least one side bias structure adjacent to the first free layer and the second free layer in a cross-track direction perpendicular to the down-track direction, the at least one side bias structure being magnetically biasing the first free layer and for the second free layer in the cross-track direction; and
   at least one rear magnetic bias structure, the differential read sensor being between the ABS and at least one the rear magnetic bias structure, the at least one rear magnetic bias structure providing a first magnetic bias for the first free layer in a first direction along a stripe height direction perpendicular to the ABS and providing a second magnetic bias for the second free layer in a second direction opposite to the first direction.

2. The magnetic read apparatus of claim 1 further comprising:
   a first shield; and
   a second shield in the down-track direction from the first shield, the differential read sensor being between the first shield and the second shield, the first free layer being closer to the first shield than the second shield;
   wherein the magnetic read apparatus is free of magnetic layers between the first free layer and the first shield and between the second free layer and the second shield, the first free layer and the second free layer adjoining the nonmagnetic spacer layer.

3. The magnetic read apparatus of claim 1 wherein the rear magnetic bias structure has a width in the cross-track direction and a length in the stripe height direction, the length being greater than the width.

4. The magnetic read apparatus of claim 3 wherein the width of the rear magnetic bias structure is substantially equal to a track width of the differential read sensor in the cross-track direction.

5. The magnetic read apparatus of claim 1 wherein the differential read sensor has a first side and a second side opposite to the first side in the cross-track direction, the at least one side bias structure including a first soft bias layer adjacent to the first side of the differential read sensor and a second soft bias structure adjacent to the second side of the differential read sensor.

6. The magnetic read apparatus of claim 1 wherein the rear bias structure includes a first rear bias layer and a second rear bias layer in a down-track direction from the first rear bias layer, the first rear bias layer providing the first magnetic bias for the first free layer in the first direction and the second rear bias layer for providing the second magnetic bias for the second free layer in the second direction, the first rear bias layer being antiferromagnetically coupled with the second rear bias layer.

7. The magnetic read apparatus of claim 6 wherein the first rear bias layer is a first soft rear bias layer and the second rear bias layer is a second soft rear bias layer.

8. The magnetic read apparatus of claim 1 wherein the first free layer is antiferromagnetically coupled with the second free layer.

9. The magnetic read apparatus of claim 1 wherein the first free layer is ferromagnetically coupled with the second free layer.

10. The magnetic read apparatus of claim 1 wherein the nonmagnetic spacer layer is a crystalline MgO tunneling barrier layer having a thickness of not more than twenty Angstroms.

11. The magnetic read apparatus of claim 1 wherein the rear magnetic bias structure magnetically biases the first free layer and the second free layer in a scissor mode.

12. The magnetic read apparatus of claim 1 wherein the differential read sensor provides a signal in response to a transition between bits in a media having differing states.

13. A data storage device comprising:
   at least one medium; and
   at least one slider including at least one magnetic transducer having an air-bearing surface (ABS) configured to reside in proximity to the at least one medium during use, the at least one magnetic transducer including a differential read sensor, at least one side bias structure and at least one rear magnetic bias structure, the differential read sensor including a first free layer, a second free layer and a nonmagnetic spacer layer residing between the first free layer and the second free layer in a down-track direction, the at least one side bias structure being adjacent to the first free layer and the second free layer in a cross-track direction perpendicular to the down-track direction, the at least one side bias structure magnetically biasing the first free layer and the second free layer in the cross-track direction, the differential read sensor being between the ABS and the rear magnetic bias structure, the at least one rear magnetic bias structure providing a first magnetic bias for the first free layer in a first direction along a stripe height direction perpendicular to the ABS and providing a second magnetic bias for the second free layer in a second direction opposite to the first direction.

14. The data storage device of claim 13 further comprising:
   a first shield; and
   a second shield in the down-track direction from the first shield, the differential read sensor being between the first shield and the second shield, the first free layer being closer to the first shield than the second shield;
   wherein the at least one magnetic transducer is free of magnetic layers between the first free layer and the first shield and between the second free layer and the second shield, the first free layer and the second free layer adjoining the nonmagnetic spacer layer, the first free layer being antiferromagnetically coupled with the second free layer;
   wherein the differential read sensor has a first side and a second side opposite to the first side in the cross-track direction, the at least one side bias structure including a first soft bias layer adjacent to the first side of the differential read sensor and a second soft bias structure adjacent to the second side of the differential read sensor; and
   wherein the rear bias structure includes a first soft rear bias layer and a second soft rear bias layer in a down-track direction from the first soft rear bias layer, the first soft rear bias layer providing the first magnetic bias for the first free layer in the first direction and the second soft rear bias layer for providing the second magnetic bias for the second free layer in the second direction, the first soft rear bias layer being antiferromagnetically coupled with the second soft rear bias layer.

15. A method for providing a magnetic read apparatus having an air-bearing surface (ABS) comprising:
   providing a differential read sensor including a first free layer, a second free layer and a nonmagnetic spacer layer residing between the first free layer and the second free layer in a down-track direction;
   providing at least one side bias structure adjacent to the first free layer and the second free layer in a cross-track direction perpendicular to the down-track direction, the at least one side bias structure being magnetically biasing the first free layer and the second free layer in the cross-track direction; and
   providing at least one rear magnetic bias structure, the differential read sensor being between the ABS and the rear magnetic bias structure, the at least one rear magnetic bias structure providing a first magnetic bias for the first free layer in a first direction along a stripe height direction perpendicular to the ABS and providing a second magnetic bias for the second free layer in a second direction opposite to the first direction.

16. The method of claim 15 further comprising:
   providing a first shield; and
   providing a second shield in the down-track direction from the first shield, the differential read sensor being between the first shield and the second shield, the first free layer being closer to the first shield than the second shield;
   wherein the magnetic read apparatus is free of magnetic layers between the first free layer and the first shield and between the second free layer and the second shield, the first free layer and the second free layer adjoining the nonmagnetic spacer layer.

17. The method of claim 15 wherein the step of providing the rear magnetic bias structure further includes:
   defining a width of the rear magnetic bias structure in the cross-track direction and a length in the stripe height direction, the length being greater than the width, the width of the rear magnetic bias structure is substantially equal to a track width of the differential read sensor in the cross-track direction.

18. The method of claim 15 wherein the differential read sensor has a first side and a second side opposite to the first side in the cross-track direction and wherein the step of providing the at least one side bias structure further includes:
   providing a soft bias layer adjacent to the first side of the differential read sensor and the second side of the differential read sensor; and
   removing a portion of the soft bias layer on top the differential read sensor.

19. The method of claim 15 wherein the step of providing the rear bias structure further includes:
   providing a first soft rear bias layer; and
   providing a second soft rear bias layer in a down-track direction from the first rear bias layer, the first soft rear bias layer providing the first magnetic bias for the first free layer in the first direction and the second soft rear bias layer for providing the second magnetic bias for the second free layer in the second direction, the first soft rear bias layer being antiferromagnetically coupled with the second soft rear bias layer.

20. The method of claim 15 wherein the first free layer is antiferromagnetically coupled with the second free layer.

21. A method for reading a plurality of bits on a magnetic recording media using a magnetic read apparatus including a read sensor and an air-bearing surface (ABS) facing the magnetic recording media during use, at least a portion of the plurality of bits being separated by a plurality of magnetic transitions, the method comprising:

driving the read sensor with a read current, the read sensor being a differential read sensor including a first free layer, a second free layer and a nonmagnetic spacer layer residing between the first free layer and the second free layer in a down-track direction, the magnetic read apparatus also including at least one side bias structure and at least one rear magnetic bias structure, the at least one side bias structure being adjacent to the differential read sensor in a cross-track direction perpendicular to the down-track direction, the at least one side bias structure magnetically biasing the first free layer and for the second free layer in the cross-track direction, the differential read sensor being between the ABS and at least one the rear magnetic bias structure, the at least one rear magnetic bias structure providing a first magnetic bias for the first free layer in a first direction along a stripe height direction perpendicular to the ABS and to provide a second magnetic bias for the second free layer in a second direction opposite to the first direction; and receiving a signal from the differential read sensor indicating the plurality of transitions.

* * * * *